United States Patent
Turtinen et al.

(10) Patent No.: US 12,495,459 B2
(45) Date of Patent: Dec. 9, 2025

(54) DATA TRANSMISSION WITH SECURITY CONFIGURATIONS

(71) Applicant: Nokia Technologies Oy, Espoo (FI)

(72) Inventors: Samuli Heikki Turtinen, Oulu (FI);
Jussi-Pekka Koskinen, Oulu (FI);
Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 335 days.

(21) Appl. No.: 18/262,412

(22) PCT Filed: Feb. 3, 2021

(86) PCT No.: PCT/CN2021/075129
§ 371 (c)(1),
(2) Date: Jul. 21, 2023

(87) PCT Pub. No.: WO2022/165681
PCT Pub. Date: Aug. 11, 2022

(65) Prior Publication Data
US 2024/0090063 A1    Mar. 14, 2024

(51) Int. Cl.
*H04W 76/19* (2018.01)
*H04W 76/20* (2018.01)
*H04W 76/30* (2018.01)

(52) U.S. Cl.
CPC ........... *H04W 76/19* (2018.02); *H04W 76/20* (2018.02); *H04W 76/30* (2018.02)

(58) Field of Classification Search
None
See application file for complete search history.

(56) References Cited

U.S. PATENT DOCUMENTS

| | | |
|---|---|---|
| 2009/0180376 A1 | 7/2009 | Gibbs |
| 2020/0221506 A1 | 7/2020 | Jeon et al. |
| 2020/0396675 A1 | 12/2020 | Liu et al. |
| 2021/0014926 A1 | 1/2021 | Xu et al. |

(Continued)

FOREIGN PATENT DOCUMENTS

CN     107889274 A     4/2018

OTHER PUBLICATIONS

Extended European Search Report received for corresponding European Patent Application No. 21923709.6, dated Dec. 13, 2024, 10 pages.

(Continued)

*Primary Examiner* — Mohammad S Adhami
(74) *Attorney, Agent, or Firm* — Barta Jones, PLLC (57) ABSTRACT

Example embodiments of the present disclosure relate to devices, methods, apparatuses and computer readable storage media of data transmission with security parameters. The method comprises: receiving, from a second device, a first plurality of parameters associated with a connection resume procedure between the first device and the second device; in accordance with a determination that the connection resume procedure is to be performed, transmitting, in the inactive state and to the second device, a request for connection resume, the request comprising one or more of the first plurality of parameters; and performing the connection resume procedure with the second device. In this way, the terminal device is capable of triggering non-SDT procedure when the SDT procedure is ongoing.

20 Claims, 4 Drawing Sheets

(56) References Cited

U.S. PATENT DOCUMENTS

| | | | |
|---|---|---|---|
| 2022/0022266 A1* | 1/2022 | Agiwal | H04W 74/004 |
| 2022/0361239 A1* | 11/2022 | Xu | H04W 76/27 |
| 2023/0088082 A1* | 3/2023 | Lin | H04W 74/0841 |
| | | | 370/329 |
| 2023/0180223 A1* | 6/2023 | Tseng | H04W 56/001 |
| | | | 370/329 |
| 2023/0380003 A1* | 11/2023 | Agiwal | H04W 72/21 |
| 2024/0306238 A1* | 9/2024 | Shi | H04W 74/0808 |

OTHER PUBLICATIONS

"RRC-less SDT over CG", 3GPP TSG-RAN WG2 #113-e, R2-2101151, Agenda: 8.6.5, Mediatek Inc., Jan. 25-Feb. 5, 2021, 7 pages.

"Small data transmission with RA-based schemes", 3GPP TSG-RAN WG2 #113-e, R2-2101214, Agenda: 8.6.4, Huawei, Jan. 25-Feb. 5, 2021, 11 pages.

"Control plane common aspects for SDT", 3GPP TSG-RAN WG2 #113-e, R2-2101184, Agenda: 8.6.3, Huawei, Jan. 25-Feb. 5, 2021, 10 pages.

Office action received for corresponding Indian Patent Application No. 202347057581, dated Oct. 22, 2024, 6 pages.

"Work Item on NR smalldata transmissions in Inactive state", 3GPP TSG RAN Meeting #86, RP-193252, Agenda: 9.1.2, ZTE Corporation, Dec. 9-12, 2019, 4 pages.

"User Plane common aspects", 3GPP TSG-RAN WG2 Meeting #113 Electronic, R2-2101203, Agenda: 8.6.2, Nokia, Jan. 25-Feb. 5, 2021, 3 pages.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"Msc-generator", Sourceforge, Retrieved on Aug. 17, 2023, Webpage available at : https://sourceforge.net/projects/msc-generator/.

International Search Report and Written Opinion received for corresponding Patent Cooperation Treaty Application No. PCT/CN2021/075129, dated Nov. 4, 2021, 9 pages.

"Positioning in RRC idle and inactive state", 3GPP TSG-RAN WG2 Meeting #112-E, R2-2009041, Agenda: 8.11.2, vivo, Nov. 2-13, 2020, 9 pages.

\* cited by examiner

DATA TRANSMISSION WITH SECURITY CONFIGURATIONS

RELATED APPLICATION

This application was originally filed as a Patent Cooperation Treaty Application No. PCT/CN2021/075129 filed on Feb. 3, 2021, which is incorporated herein by reference in its entirety.

FIELD

Embodiments of the present disclosure generally relate to the field of telecommunication and in particular, to devices, methods, apparatus and computer readable storage media of data transmission with security configurations.

BACKGROUND

The 5th generation mobile network also refers to 5G New Radio (NR). It is a new global wireless standard after 1G, 2G, 3G, and 4G networks. 5G enables a new kind of network that is designed to connect virtually everyone and everything together including machines, objects, and devices. 5G wireless technology is meant to deliver higher multi-Gbps peak data speeds, ultra-low latency, more reliability, massive network capacity, increased availability, and a more uniform user experience to more users. Higher performance and improved efficiency empower new user experiences and connects new industries.

The NR proposes a new RRC state, namely, an RRC_INACTIVE state. In the RRC_INACTIVE state, multiple Uplink (UL)/Downlink (DL) packet transmissions, for example, infrequent and small data traffic are supported. The UL/DL packet transmissions may be transmitted in a small data transmission (SDT) procedure, during which a User Equipment (UE) is not transitioned into an RRC_CONNECTED state. The SDT procedure in the RRC_INACTIVE state can be achieved based on a Random Access Channel (RACH) procedure or configured grant (CG).

SUMMARY

In general, example embodiments of the present disclosure provide a solution of data transmission with security configurations.

In a first aspect, there is provided a first device. The first device comprises at least one processor; and at least one memory including computer program codes; the at least one memory and the computer program codes are configured to, with the at least one processor, cause the first device at least to: receive, from a second device, a first plurality of parameters associated with a connection resume procedure between the first device and the second device; in accordance with a determination that the connection resume procedure is to be performed, transmit, in an inactive state and to the second device, a request for connection resume, the request comprising one or more of the first plurality of parameters; and perform the connection resume procedure with the second device.

In a second aspect, there is provided a second device. The second device comprises at least one processor; and at least one memory including computer program codes; the at least one memory and the computer program codes are configured to, with the at least one processor, cause the second device at least to: transmit, to a first device, a first plurality of parameters associated with a connection resume procedure between the first device and the second device; receive, from the first device, a request for connection resume, the request comprising one or more of the first plurality of parameters; and in response to the request, perform the connection resume procedure with the first device.

In a third aspect, there is provided a method. The method comprises: receiving, at a first device and from a second device, a first plurality of parameters associated with a connection resume procedure between the first device and the second device; in accordance with a determination that the connection resume procedure is to be performed, transmitting, in an inactive state and to the second device, a request for connection resume, the request comprising one or more of the first plurality of parameters; and performing the connection resume procedure with the second device.

In a fourth aspect, there is provided a method. The method comprises: transmitting, to a first device, a first plurality of parameters associated with a connection resume procedure between the first device and the second device; receiving, from the first device, a request for connection resume, the request comprising one or more of the first plurality of parameters; and in response to the request, performing the connection resume procedure with the first device.

In a fifth aspect, there is provided a first apparatus comprising: means for receiving, from a second apparatus, a first plurality of parameters associated with a connection resume procedure between the first apparatus and the second apparatus; means for in accordance with a determination that the connection resume procedure is to be performed, transmitting, in an inactive state and to the second apparatus, a request for connection resume, the request comprising one or more of the first plurality of parameters; and means for performing the connection resume procedure with the second apparatus.

In a sixth aspect, there is provided a second apparatus comprising: means for transmitting, to a first apparatus, a first plurality of parameters associated with a connection resume procedure between the first apparatus and the second apparatus; means for receiving, from the first apparatus, a request for connection resume, the request comprising one or more of the first plurality of parameters; and means for in response to the request, performing the connection resume procedure with the first apparatus.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Conventionally, the data transmission cannot be performed in the RRC_INACTIVE state. That is, the UE has to resume the connection (i.e., move to RRC_CONNECTED state) for any DL and UL data. For each data transmission, no matter how small and infrequent the data packets are, the connection setup and subsequently release to INACTIVE state must be performed, which may result in unnecessary power consumption and signalling overhead.

Signalling overhead from INACTIVE state UEs for small data packets is a problem that cannot be ignored. In general, any device that has intermittent small data packets in INACTIVE state will benefit from enabling small data transmission in INACTIVE state. Therefore, in order to improve network performance and efficiency and the UE battery performance, it has been proposed that the SDT in the RRC_INACTIVE state can be supported in NR. The 2-step, 4-step RACH and configured grant type-1 have already been specified for achieving the data transmission in the RRC_INACTIVE state.

For RACH based SDT, upon successful completion of contention resolution, the UE shall monitor the Cell-Radio Network Temporary Identifier (C-RNTI). For CG based SDT, the configuration of configured grant resource for UE uplink small data transmission can be contained in the RRCRelease message. The Configuration is only type 1 CG with no contention resolution procedure for CG.

Furthermore, for both RACH based SDT and CG based SDT, when the UE is in RRC_INACTIVE state, it should be possible to send multiple UL and DL packets as part of the same SDT mechanism and without transitioning to RRC_CONNECTED on dedicated grant.

During an ongoing SDT procedure, if there is data arrival in a non-SDT data radio bearer (DRB), the UE may terminate the ongoing SDT procedure immediately and trigger a RRC resume procedure. At this point, security configuration or parameters thereof, which are allocated by a base station (e.g., the gNB) before the UE enters into the RRC_INACTIVE state, have already been used for the SDT transmission. Such security configuration or parameters typically are one-time parameters and should not be used for another RRC Connection/Resume attempt due to security requirements. As a result, there is no security configuration available for the non-SDT procedure.

In order to solve the above and other potential problems, embodiments of the present disclosure provide a solution for data transmission with security configurations. In general, a network device (e.g., the gNB) serving a terminal device (e.g., the UE) provides at least one set of security configurations in advance, and the terminal device is capable of performing the SDT and non-SDT procedures by using different security configurations. For example, the terminal device is capable of triggering a non-SDT procedure due to an arrival of non-SDT data, when the SDT procedure is ongoing. In addition, when the SDT transmission is failed, there is no need to transition the terminal device in the RRC_IDLE state, as long as there are available security parameters in the set. As such, the data transmission can be more efficient and flexible, and unnecessary power consumption and signaling overhead can be reduced Example embodiments of the present disclosure will be described in detail below with reference to the accompanying drawings. Principle and embodiments of the present disclosure will be described in detail below with reference to the accompanying drawings.

Figure 1:
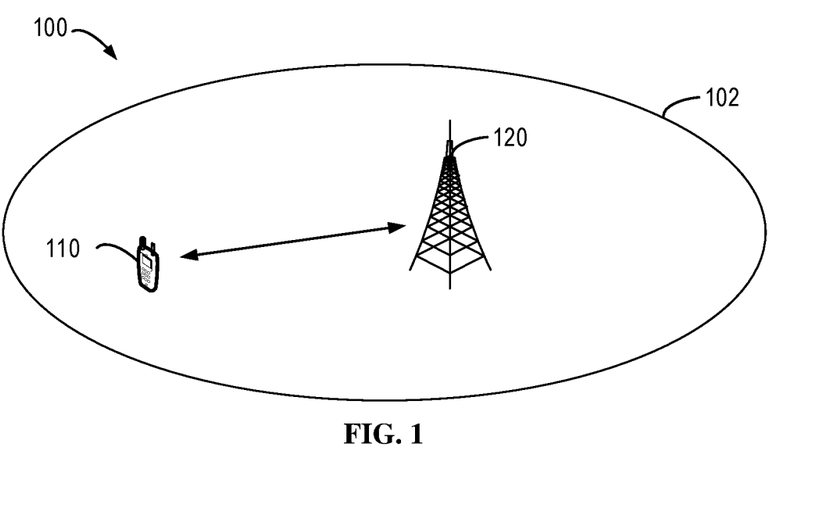
FIG. 1 illustrates an example communication network in which example embodiments of the present disclosure can be implemented.

FIG. 1 shows an example communication network 100 in which embodiments of the present disclosure can be implemented. As shown in FIG. 1, the communication network 100 includes a first device 110 and a second device 120.

The first device 110 (hereinafter may also be referred to as a terminal device 110 or a UE 110) is located within a cell 102 of the second device 120, and may communicate with the second device 120. The first device 110 may perform the SDT and/or non-SDT procedures with the second device 120, which will be discussed in details below. The SDT procedure may comprise the first device 110 transmitting a RRC message and additionally data (user or control plane data) while in RRC_INACTIVE mode. In some examples the RRC message may be a RRC resume request message, RRC setup request message, RRC re-establishment request message, RRC SDT request message, RRC SDT resume request message, or the like. The non-SDT procedure may comprise the first device 110 transitioned to RRC_CONNECTED state from RRC_IDLE or RRC_INACTIVE states. In some examples the non-SDT procedure may comprise the first device 110 transmitting a RRC message. In some examples the RRC message may be a RRC resume request message, RRC setup request message, RRC re-establishment request message, RRC SDT request message, RRC SDT resume request message, or the like.

The second device 120 (hereinafter may also be referred to as a network device 120 or a gNB 120) provides the cell 102 and serves the first device 110. The second device 120 may transmit security configurations for data transmission related to RRC_INACTIVE state to the first device 110. In the context of the present disclosure, the security configurations may include, but not limited to, Inactive Radio Network Temporary Identifiers (I-RNTIs) and Next-hop Chaining Counts (NCCs). The I-RNTIs may include short I-RNTIs and/or full I-RNTIs. The short I-RNTI may include the identity of the first device 110 (e.g., the UE ID), the identity of the second device 120 (e.g., the gNB ID), and may be 24 bits. The full I-RNTI may include the identity of the first device 110, the identity of the second device 120, and may be 40 bits.

Additionally, the communication network 100 may further include a third device (not shown). The third device may be another network device and provide a neighbor cell. The cell reselection procedure may be triggered by the first device 110 between the cell 102 and the neighbor cell with the security configurations.

It is to be understood that the number of terminal devices and network devices are only for the purpose of illustration without suggesting any limitations. The communication network 100 may include any suitable number of terminal devices adapted for implementing embodiments of the present disclosure.

Only for ease of discussion, the first device 110 is illustrated as a UE, and the second device 120 is illustrated as a base station. It is to be understood that UE and base station are only example implementations of the first device 110 and the second device 120 respectively, without suggesting any limitation as to the scope of the present application. Any other suitable implementations are possible as well.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Figure 2:
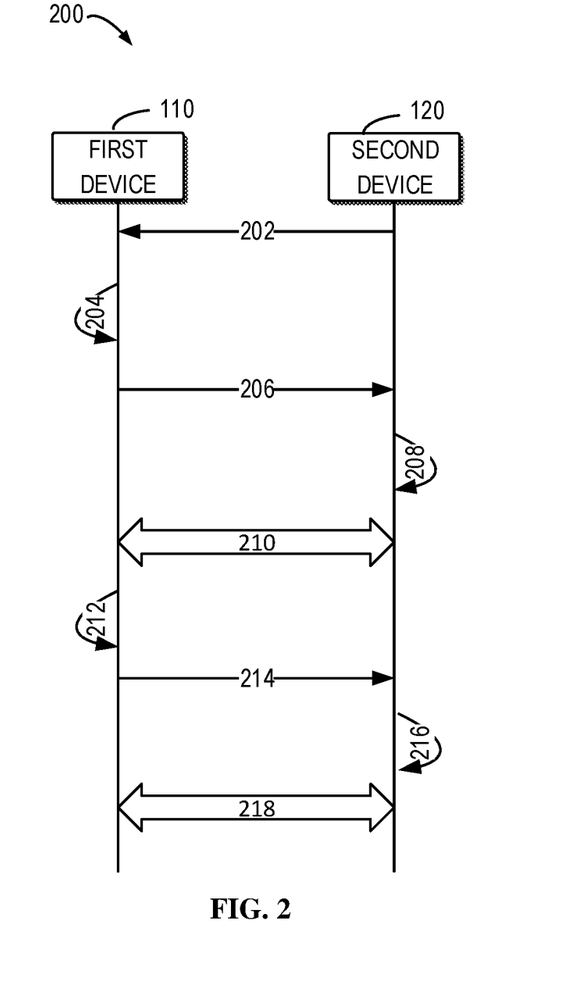
FIG. 2 shows a signaling chart illustrating a process of data transmission with security configurations according to some example embodiments of the present disclosure.

Principle and implementations of the present disclosure will be described in detail below with reference to FIG. 2. FIG. 2 shows a signaling chart illustrating a process of data transmission with security configurations according to some example embodiments of the present disclosure. For the purpose of discussion, the process 200 will be described with reference to FIG. 1. The process 200 may involve the first device 110 and the second device 120.

As shown in FIG. 2, the second device 120 transmits 202 a first plurality of parameters to the first device 110. The first plurality of parameters may be security parameters associated with the RRC connection resume procedure between the first device 110 and the second device 120. The RRC connection resume procedure may include one of the SDT procedure or non-SDT procedure. The SDT procedure or the non-SDT procedure may include a RRC resume procedure, a RRC establishment procedure, and a RRC re-establishment procedure and so on.

The first plurality of parameters may include but not limited to the I-RNTI, the NCC and so on. The I-RNTI may be a short I-RNTI and/or a full I-RNTI. The short I-RNTI may include the identity of the first device 110 (e.g., the UE ID), the identity of the second device 120 (e.g., the gNB ID), and may include 24 bits. The full I-RNTI may include the identity of the first device 110 (e.g., the UE ID), the identity of the second device 120 (e.g., the gNB ID), and PLMN identity, and may include 40 bits.

For example, the first plurality of parameters may include a plurality of I-RNTIs. In some example embodiments, a first I-RNTI of the plurality of I-RNTIs may be a full I-RNTI or a short I-RNTI including the identity of the first device 110 (e.g., the UE ID) and the identity of the second device 120 (e.g., the gNB ID), and a rest of the plurality of I-RNTIs are I-RNTIs including only the identities of the first device 110. In some other example embodiments, all the plurality of I-RNTIs may comprise full I-RNTIs or short I-RNTIs. In some other example embodiments, the plurality of I-RNTIs may comprise full I-RNTIs and short I-RNTIs.

In some example embodiments, the first plurality of parameters may be received in various RRC messages, including but not limited to the RRC release message, the RRC reconfiguration message, the RRC resume message, the RRC setup message, the RRC security mode command message, the RRC reestablishment message and so on.

In some example embodiments, the first plurality of parameters may include a first subset of the first plurality of parameters associated with the SDT procedure and a second subset of the first plurality of parameters associated with the non-SDT procedure. In these embodiments, the first device 110 may select one or more parameters from the first subset for the SDT procedure, and different one or more parameters from the second subset for the non-SDT procedure.

In some example embodiments, the first device 110 may use the first plurality of parameters in the order provided by the second device 120 or a predetermined order, which indicates each of the first plurality of parameters may be associated with the SDT procedure or the non-SDT procedure, for example, depending on whether the SDT procedure or the non-SDT procedure is to be performed. In some examples, the order provided by the second device 120 or the predetermined order is determined as ascending or descending order of the first plurality of parameters. Alternatively, the first device 110 may select one or more parameters from the first plurality of the parameters in a random order.

In some example embodiments, the first device 110 may receive, from the second device 120, an indication for indicating whether each of the first plurality of parameters is associated with the SDT procedure or the non-SDT procedure.

The first device 110 may receive, from the second device 120, an indication for indicating whether a second plurality of parameters associated with the SDT or the non-SDT procedures is released or remained. The second plurality of parameters may be transmitted earlier than the first plurality of parameters, and, in some examples, the second plurality of parameters may not overlap with the first plurality of parameters.

In some example embodiments, the second device 120 may transmit such indication in the RRC release message for transitioning the first device 110 into RRC_INACTIVE state. In some other embodiments, the second device 120 may transmit such indication with the first plurality of parameters. In still other embodiments, upon receipt of the first plurality of parameters, the first device 110 may release all the old parameters in the second plurality of parameters regardless of whether there are available parameters that are unused for data transmissions. Alternatively, if no new parameter is provided in a RRC release message, the first device 110 may remain the second plurality of parameters.

The first device 110 may determine the connection resume procedure is to be performed, and transmit a request for connection resume to the second device 120. The request may include one or more of the first plurality of parameters. Depending on whether the SDT procedure or the non-SDT procedure is to be performed, the request may be a first request for causing the SDT procedure to be performed or a second request for causing the non-SDT procedure to be performed.

In some example embodiments, the first device 110 determines 204 the SDT procedure is to be performed. The first device 110 transmits 206, a first request to the second device 120. The first request may include at least one of the first plurality of parameters and may cause the SDT procedure to be performed with the second device 120.

Upon receipt of the first request from the first device 110, the second device 120 determines 208 that the first request is for the SDT procedure and the first request includes at least one of the first plurality of parameters. In this case, the second device 120 then performs 210 the SDT procedure with the first device 110.

In a case where the SDT procedure is successful, the first device 110 may transmit the data related to the SDT to the second device 120. In some example embodiments, the first device 110 may determine further data related to the SDT to be transmitted and none of the first plurality of parameters is available for the SDT procedure. In these embodiments, the first device 110 may transmit the further data through the non-SDT procedure. For example, the first device 110 may transmit a further request to the second device 120. The further request may include at least one of the first plurality of parameters for the non-SDT procedure and cause the non-SDT procedure to be performed with the second device 120. Once the non-SDT procedure is successful, the first device 110 may transmit the further data to the second device 120 in the non-SDT procedure. For example, the non-SDT procedure may comprise a RRC resume procedure where the first device 110 is transitioned to RRC_CONNECTED state with the second device 120.

In the above embodiments, the first device 110 may transmit a first indication for indicating that none of the first plurality of parameters is available for the SDT procedure to the second device 120. Upon receipt of the first indication, the second device 120 may transmit a third plurality of parameters at least associated with the SDT procedure to the first device 110. For the purpose of security requirements, for example, the third plurality of parameters should not overlap with the first plurality of parameters.

The SDT procedure may be failed for various reasons, for example, the cell reselection is triggered during the SDT procedure by the first device 110, radio conditions, non-SDT data available for transmission, an expiration of the SDT timer, TA is not valid, a failure of the contention resolution, and so on. In the case where the SDT procedure is failed, for example, the contention resolution is not successful in a first attempt, there may be no need to change the at least one parameter selected for the SDT procedure. In this case, the first device 110 may transmit a third request to the second device 120, and the third request includes the at least one parameter.

In some example embodiments, the first device 110 determines 212 that the non-SDT procedure is to be transmitted. The first device 110 transmits 214, a second request to the second device 120. The second request may include at least another one of the first plurality of parameters and may cause the non-SDT procedure to be performed with the second device 120.

Upon receipt of the second request from the first device 110, the second device 120 determines 216 that the second request is for the non-SDT procedure and the second request includes the at least another one of the first plurality of parameters. In this case, the second device 120 then performs 218 the non-SDT procedure with the first device 110. For example, the non-SDT procedure may comprise RRC resume procedure where the first device 110 is transitioned to RRC_CONNECTED state with the second device 120.

During the SDT procedure, the first device 110 may initiate the non-SDT procedure with the second device 120. In some example embodiments, if none of the first plurality of parameters is available for the non-SDT procedure, the first device 110 may enter into RRC_IDLE state, and then trigger the RRC connection establishment procedure by using a RRC setup request message.

In some other embodiments, if none of the first plurality of parameter is available for the non-SDT procedure, the first device 110 may transmit a second indication to the second device 120. Upon receipt of the second indication, the second device 120 may transmit a fourth plurality of parameters at least associated with the non-SDT procedure to the first device 110. For the purpose of security requirements, for example, the fourth plurality of parameters should not overlap with the first plurality of parameters.

In some example embodiments, during the SDT procedure, the first device 110 may perform a cell reselection procedure with the third device. In this case, the first device 110 may use a further one of the first plurality of parameters for a third request to the third device after the cell reselection procedure that are different from the at least one parameter for the SDT procedure.

According to the example embodiments of the present disclosure, the network device allocates a set of security parameters separately for SDT and non-SDT procedures. In this way, the terminal device is capable of triggering a non-SDT procedure, for example, due to an arrival of non-SDT data, when the SDT procedure is ongoing. In addition, when the SDT transmission is failed, there is no need to transition the terminal device in the RRC_IDLE state, as long as there are available security parameters in the set. As such, the data transmission can be more efficient and flexible, and unnecessary power consumption and signaling overhead can be reduced.

Figure 3:
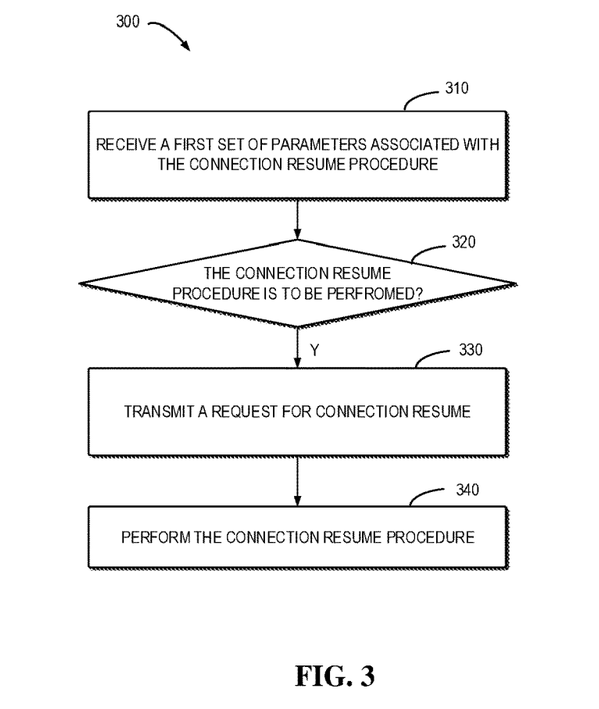
FIG. 3 illustrates a flowchart of an example method of data transmission with security configurations according to some example embodiments of the present disclosure.

FIG. 3 illustrates a flowchart of an example method 300 of data transmission with security configurations according to some example embodiments of the present disclosure. The method 300 can be implemented at a terminal device, e.g., the first device 110 described with reference to FIG. 1. For the purpose of discussion, the method 300 will be described with reference to FIG. 1.

The first device 110 receives, at 310, a first plurality of parameters from the second device 120. The first plurality of parameters may be associated with a connection resume procedure between the first device 110 and the second device 120, including, for example, the SDT procedure and the non-SDT procedure.

In some example embodiments, the first plurality of parameters may be received in various RRC message, including but not limited to the RRC release message, the RRC reconfiguration message, the RRC resume message, the RRC setup message, the RRC security mode command message, the RRC reestablishment message and so on.

In some example embodiments, the first plurality of parameters may be security parameters including but not limited to the NCC, the I-RNTI and so on. For example, the first plurality of parameters may include a plurality of I-RNTIs. In some example embodiments, a first I-RNTI of the plurality of I-RNTIs may be a full I-RNTI or a short I-RNTI including the identity of the first device 110 (e.g., the UE ID) and the identity of the second device 120 (e.g., the gNB ID), and a rest of the plurality of I-RNTIs are I-RNTIs including only the identities of the first device 110. In some other example embodiments, all the plurality of I-RNTIs may comprise full I-RNTIs or short I-RNTIs. In some other example embodiments, the plurality of I-RNTIs may comprise full I-RNTIs and short I-RNTIs In some example embodiments, the first plurality of parameters may include a first subset of the first plurality of parameters associated with the SDT procedure and a second subset of the first plurality of parameters associated with the non-SDT procedure.

In some example embodiments, the first plurality of parameters may be ranked in a predetermined order, which indicates each of the first plurality of parameters is associated with the SDT procedure or the non-SDT procedure. The SDT procedure or the non-SDT procedure may include a RRC resume procedure, a RRC establishment procedure, a RRC re-establishment procedure and so on.

In some example embodiments, the first device 110 may receive, from the second device 120, an indication for indicating whether each of the first plurality of parameters is associated with the SDT procedure or the non-SDT procedure, for example, depending on whether the SDT procedure or the non-SDT procedure is to be performed. In some examples, the order provided by the second device 120 or the predetermined order is determined as ascending or descending order of the first plurality of parameters The first device 110 may then enter into the inactive state. At 320, the first device 110 determines whether the connection resume procedure is to be performed.

If the first device 110 determines, at 320, the connection resume procedure is to be performed, the first device 110 transmits, at 330, a request for connection resume to the second device 120. The request may include one or more of the first plurality of parameters.

Depending on whether the SDT procedure or the non-SDT procedure is to be performed, the request may be a first request for causing the SDT procedure to be performed and a second request for causing the non-SDT procedure to be performed. For example, if the first device 110 determines, at 320, the SDT is to be performed, the first device 110 transmits, at 330, the first request to the second device 120. The first request may include at least one of the first plurality of parameters. For another example, if the first device 110 determines, at 320, the non-SDT is to be performed, the first device 110 transmits, at 330, the second request to the second device 120. The second request may include at least another one of the first plurality of parameters.

In some example embodiments, the request may include but not limited to the RRC resume request, the RRC reestablishment request, the RRC SDT request and so on.

In some example embodiments, the first device 110 may determine the one or more parameter based on the order in the first plurality of parameters.

At 340, the first device 110 performs the connection resume procedure with the second device. In a case the SDT procedure is performed and is successful, the first device 110 may transmit data related to the SDT to the second device 120. If the SDT procedure with the second device 120 is failed, the first device 110 may transmit a third request to the second device 120. The third request may include the at least one parameter that was included in the first request.

In a case where further data related to the SDT is to be transmitted and none of the first plurality of parameters is available for the SDT procedure, the first device 110 may transmit a further request to the second device 120. The further request may include at least one of the first plurality of parameters for the non-SDT procedure and cause the non-SDT procedure to be performed with the second device 120. In this case, the first device 110 may transmit the further data in the non-SDT procedure to the second device 120.

In a case where none of the first plurality of parameters is available for the SDT procedure, the first device 110 may transmit a first indication to the second device 120. The first indication may be configured to indicate that none of the first plurality of parameters is available for the SDT procedure. In this case, the first device 110 may then receive a third plurality of parameters at least associated with the SDT procedure from the second device 120. The third plurality of parameters should not overlap with the first plurality of parameters.

In a case where further data related to the non-SDT is to be transmitted and none of the first plurality of parameters is available for the non-SDT procedure, the first device 110 may transmit a second indication to the second device 120. The second indication may be configured to indicate that none of the first plurality of parameters is available for the non-SDT procedure. In this case, the first device 110 may then receive a fourth plurality of parameters at least associated with the non-SDT procedure from the second device 120. Similarly, the fourth plurality of parameters should not overlap with the first plurality of parameters.

In some example embodiments, the first device 110 may perform a cell reselection procedure with the third device based on a further one of the first plurality of parameters.

In some example embodiments, the first device 110 may receive an indication from the second device 120 for indicating whether a second plurality of parameters associated with the SDT and non-SDT procedures is released or remained. The second plurality of parameters are received earlier than the first plurality of parameters. For the purpose of security requirements, the second plurality of parameters should not overlap with the first plurality of parameters.

Figure 4:
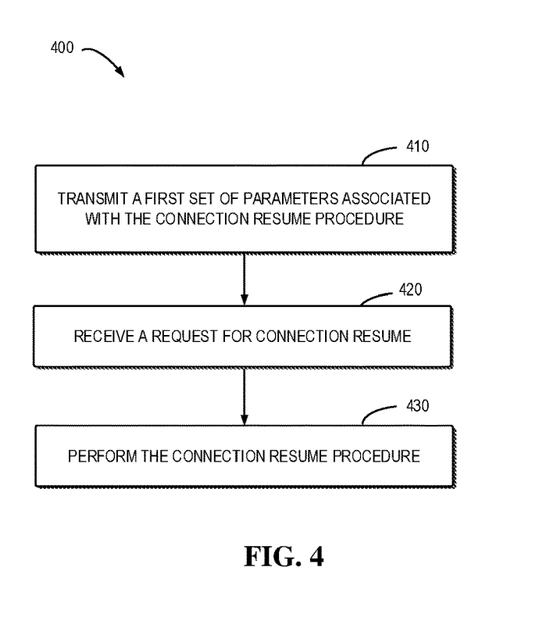
FIG. 4 illustrates a flowchart of an example method of data transmission with security configurations according to some example embodiments of the present disclosure.

FIG. 4 illustrates a flowchart of an example method 400 of data transmission with security configurations according to some example embodiments of the present disclosure. The method 400 can be implemented at a network device, e.g., the second device 120 described with reference to FIG.

1. For the purpose of discussion, the method 400 will be described with reference to FIG. 1.

Before the first device 110 entering into the inactive state (e.g., the RRC_INACTIVE state), the second device 120 transmits, at 410, a first plurality of parameters to the first device 110. The first plurality of parameters may be associated with the connection resume procedure between the first device 110 and the second device 120, for example, the RRC connection resume procedure, which may include the SDT procedure and the non-SDT procedure.

In some example embodiments, the first plurality of parameters may be received in various RRC message, including but not limited to the RRC release message, the RRC reconfiguration message, the RRC resume message, the RRC setup message, the RRC security mode command message, the RRC reestablishment message and so on.

In some example embodiments, the first plurality of parameters may be security parameters including but not limited to the NCC, the I-RNTI and so on. For example, the first plurality of parameters may include a plurality of I-RNTIs. In some example embodiments, a first I-RNTI of the plurality of I-RNTIs may be a full I-RNTI or a short I-RNTI including the identity of the first device 110 (e.g., the UE ID) and the identity of the second device 120 (e.g., the gNB ID), and a rest of the plurality of I-RNTIs are I-RNTIs including only the identities of the first device 110. In some other example embodiments, all the plurality of I-RNTIs may comprise full I-RNTIs or short I-RNTIs. In some other example embodiments, the plurality of I-RNTIs may comprise full I-RNTIs and short I-RNTIs.

In some example embodiments, the first plurality of parameters may include a first subset of the first plurality of parameters associated with the SDT procedure and a second subset of the first plurality of security associated with the non-SDT procedure.

In some example embodiments, the first plurality of parameters may be ranked in a predetermined order, which indicates each of the first plurality of parameters is associated with the SDT procedure or the non-SDT procedure.

In some example embodiments, the second device 120 may transmit an indication to the first device 110 for indicating whether each of the first plurality of parameters is associated with the SDT procedure or the non-SDT procedure.

The first device 110 may then enter into the inactive state, and may determine that one of the SDT procedure or non-SDT procedure is to be performed. The SDT procedure or the non-SDT procedure may include a RRC resume procedure, a RRC establishment procedure, a RRC re-establishment procedure and so on. To initiate a corresponding one of the SDT procedure or non-SDT procedure, the first device 110 may transmit a request for connection resume to the second device 120.

At 420, the second device 120 receives, from the first device 110, the request for connection resume. The request may include one or more of the first plurality of parameters. Depending on whether the SDT procedure or the non-SDT procedure is to be performed, the request may be a first request for causing the SDT procedure to be performed and a second request for causing the non-SDT procedure to be performed.

In some example embodiments, the request received from the first device 110 may include, but not limited to the RRC resume request, the RRC reestablishment request, the RRC SDT request and so on. The request may include one or more of the first plurality of parameters.

In some example embodiments, the second device 120 may determine whether a first request or a second request is received from the first device 110. In some example embodiments, the second device 120 may determine whether the one or more parameter is associated with the SDT procedure or non-SDT procedure based on a resource on which the request is received.

At 430, upon receipt of the request, the second device 120 performs the connection resume procedure with the first device 110, i.e., a corresponding one of the SDT procedure and the non-SDT procedure with the first device. For example, if the second device 120 determines that the first request is received and the first request includes at least one of the first plurality of parameters, at 430, the second device 120 performs the SDT procedure with the first device 110. In a case where the SDT procedure is successful, the second device 120 may receive data related to the SDT from the first device 110.

In some example embodiments, if the contention resolution of the Random Access (RA) procedure in SDT procedure is successful or if the RA procedure is completed or if the first device 110 has a valid C-RNTI, and the SDT procedure is ongoing, and there is non-SDT data to be transmitted, in this case, the first device 110 may transmit a new RRC message e.g. via SRB1, or an existing RRC message, e.g. UE assistance information message to indicate its preference to go to CONNECTED mode, or new MAC CE for requesting connection for non-SDT data. Upon reception of the RRC message or the MAC CE, the second device 120 may transit the first device 110 in RRC_CONNECTED state.

In a case where the SDT procedure is failed due to various reasons, for example, the cell reselection triggered during the SDT procedure, radio conditions, non-SDT data available for transmission, an expiration of the SDT timer, TA is valid, a failure of the contention resolution, and so on, a new SDT procedure may be initiated between the first device 110 and the second device 120.

In some example embodiments, after performing the SDT procedure with the first device 110, the second device 120 may receive, from the first device 110 in the inactive state, another request. In these embodiments, if the other request is the second request that includes at least a further one of the first plurality of parameters, the second device 120 may perform the non-SDT procedure with the first device 110.

For another example, if the second device 120 determines that the second request is received, at 430, the second device 120 performs the non-SDT procedure with the first device 110. For example, the non-SDT procedure comprises RRC resume procedure where the first device 110 is transitioned to RRC_CONNECTED state with the second device 120.

In some example embodiments, the second device 120 may receive a further request from the first device 110. If the second device 120 determines that the request is the second request that includes at least one of the first plurality of parameters for the non-SDT procedure, the second device 120 may perform the non-SDT procedure with the first device 110. The second device 120 may then receive the further data in the non-SDT procedure.

In above embodiments, the second device 120 may receive, from the first device 110, a first indication for none of the first plurality of parameters being available for the SDT procedure. Upon receipt of the first indication, the second device 120 may transmit a third plurality of parameters at least associated with the SDT procedure to the first device 110. For the purpose of security requirements, the third plurality of parameters should not overlap with the first plurality of parameters.

In a case where the SDT procedure is successful, the second device 120 may further receive, from the first device 110, a second indication for none of the first plurality of parameters being available for the non-SDT procedure. Upon receipt of the second indication, the second device 120 may transmit a fourth plurality of parameters at least associated with the non-SDT procedure to the first device 110. Similarly, the fourth plurality of parameters should not overlap with the first plurality of parameters.

In some example embodiments, the second device 120 may transmit, to the first device 110, an indication for indicating whether a second plurality of parameters associated with the SDT and non-SDT procedures is released or remained. The second plurality of parameters are transmitted earlier than the first plurality of parameters, and the second plurality of parameters should not overlap with the first plurality of parameters.

In the above embodiments, the second device 120 may transmit the RRC release message to the first device 110 in the inactive state for indicating if the second plurality of parameters should be released or kept. Alternatively, such an indication may be transmitted with the first plurality of parameters.

In the above embodiments, the second device 120 may explicitly indicate the first device 110 to all the old parameters in the old set, that is, the second plurality of parameters is to be released regardless of whether there are available parameters. Alternatively, in a case that no new parameter is provided in the RRC release message, it implicitly indicates that the parameters in the second plurality should be kept at the first device 110.

In some example embodiments, a first apparatus capable of performing the method 300 (for example, the first device 110) may comprise means for performing the respective steps of the method 300. The means may be implemented in any suitable form. For example, the means may be implemented in a circuitry or software module. The first apparatus may be implemented as or included in the first device 110. In some embodiments, the means may comprise at least one processor and at least one memory including computer program code. The at least one memory and computer program code are configured to, with the at least one processor, cause performance of the first apparatus.

In some example embodiments, the first apparatus comprises: means for receiving, from a second apparatus, a first plurality of parameters associated with a connection resume procedure between the first apparatus and the second apparatus; means for in accordance with a determination that the connection resume procedure is to be performed, transmitting, in an inactive state and to the second apparatus, a request for connection resume, the request comprising one or more of the first plurality of parameters; and means for performing the connection resume procedure with the second apparatus.

In some example embodiments, the first plurality of parameters comprise at least one of a Next-hop Chaining Count, NCC, and an Inactive Radio Network Temporary Identifier, I-RNTI.

In some example embodiments, the first plurality of parameters comprise a plurality of I-RNTIs, and wherein a first I-RNTI of the plurality of I-RNTIs comprises an identity of the first apparatus and an identity of the second apparatus, and a rest of the plurality of I-RNTIs comprise only the identities of the first apparatus.

In some example embodiments, the first plurality of parameters comprise at least one of a plurality of NCCs, a plurality of full I-RNTIs, and a plurality of short I-RNTIs.

In some example embodiments, the first plurality of parameters are received in one of a Radio Resource Control, RRC, release message, a RRC reconfiguration message, a RRC resume message, a RRC setup message, a RRC security mode command message, or a RRC reestablishment message.

In some example embodiments, the connection resume procedure comprises a Small Data Transmission, SDT, procedure and a non-SDT procedure.

In some example embodiments, the SDT procedure or the non-SDT procedure comprises one of a RRC resume procedure, a RRC establishment procedure, and a RRC reestablishment procedure.

In some example embodiments, the first plurality of parameters comprise a first subset of the first plurality of parameters associated with the SDT procedure and a second subset of the first plurality of parameters associated with the non-SDT procedure.

In some example embodiments, the first plurality of parameters are ranked in a predetermined order indicating each of the first plurality of parameters is associated with the SDT procedure or the non-SDT procedure.

In some example embodiments, the request comprises one of a Radio Resource Control, RRC, resume request, a RRC reestablishment request, or a RRC SDT request.

In some example embodiments, the request comprises one of a Radio Resource Control, RRC, resume request, a RRC reestablishment request, or a RRC SDT request.

In some example embodiments, the first apparatus further comprises means for receiving, from the second apparatus, an indication for indicating whether each of the first plurality of parameters is associated with the SDT procedure or the non-SDT procedure.

In some example embodiments, the first apparatus further comprises means for determining the at least one parameter and the at least another one parameter based on an order in the first plurality of parameters.

In some example embodiments, the means for transmitting the request comprises: means for in accordance with a determination that the SDT procedure is to be performed, transmitting, in an inactive state and to the second apparatus, a first request for causing the SDT procedure to be performed, the first request comprising at least one of the first plurality of parameters; and means for in accordance with a determination that the non-SDT procedure is to be performed, transmitting, in an inactive state and to the second apparatus, a second request for causing the non-SDT procedure to be performed, the second request comprising at least another one of the first plurality of parameters.

In some example embodiments, the first apparatus further comprises: means for in accordance with a determination that further data related to the SDT is to be transmitted and none of the first plurality of parameters is available for the SDT procedure, transmitting, to the second apparatus, a further request for causing the non-SDT procedure to be performed, the further request comprising at least one of the first plurality of parameters associated with the non-SDT procedure; and means for transmitting, to the second apparatus, the further data in the non-SDT procedure.

In some example embodiments, the first apparatus further comprises: means for transmitting, to the second apparatus, a first indication for indicating that no parameter is available for the SDT procedure in the first plurality; and means for receiving a third plurality of parameters at least associated with the SDT procedure from the second apparatus, the third plurality of parameters not overlapping with the first plurality of parameters.

In some example embodiments, in accordance with a determination that the SDT procedure is to be performed, the means for performing the SDT procedure comprises: means for transmitting data related to the SDT to the second apparatus.

In some example embodiments, the first apparatus further comprises: means for in accordance with a determination that the SDT procedure is failed, transmitting, to the second apparatus, a third request comprising the one or more of the first plurality of parameters.

In some example embodiments, the first apparatus further comprises: means for in accordance with a determination that further data related to the non-SDT is to be transmitted and none of the first plurality of parameters is available for the non-SDT procedure, transmitting a second indication to the second apparatus; and means for receiving a fourth plurality of parameters at least associated with the non-SDT procedure from the second apparatus, the fourth plurality of parameters not overlapping with the first plurality of parameters.

In some example embodiments, the first apparatus comprises: means for perform a cell reselection procedure with a third apparatus based on at least a further one of the first plurality of parameters, the third apparatus being different from the second apparatus.

In some example embodiments, the first apparatus comprises: means for receiving, from the second apparatus, an indication for indicating whether a second plurality of parameters associated with the SDT and non-SDT procedures is released or remained, the second plurality of parameters not overlapping with the first plurality of parameters, and the second plurality of parameters received earlier than the first plurality of parameters.

In some example embodiments, the first apparatus comprises a terminal device and the second apparatus comprises a network device.

In some example embodiments, a second apparatus capable of performing the method 400 (for example, the second device 120) may comprise means for performing the respective steps of the method 400. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the second apparatus. The second apparatus may be implemented as or included in the second device 120.

In some example embodiments, the second apparatus comprises: means for transmitting, to a first apparatus, a first plurality of parameters associated with a connection resume procedure between the first apparatus and the second apparatus; means for transmitting, to a first apparatus, a first plurality of parameters associated with a connection resume procedure between the first apparatus and the second apparatus; and means for in response to the request, performing the connection resume procedure with the first apparatus.

In some example embodiments, the first plurality of parameters comprise at least one of a Next-hop Chaining Count, NCC, and an Inactive Radio Network Temporary Identifier, I-RNTI.

In some example embodiments, the first plurality of parameters comprise a plurality of I-RNTIs, and wherein a first I-RNTI of the plurality of I-RNTIs comprises an identity of the first apparatus and an identity of the second apparatus, and a rest of the plurality of I-RNTIs comprise only the identities of the first apparatus.

In some example embodiments, the first plurality of parameters comprise at least one of a plurality of NCCs, a plurality of full I-RNTIs, and a plurality of short I-RNTIs.

In some example embodiments, the first plurality of parameters are received in one of a Radio Resource Control, RRC, release message, a RRC reconfiguration message, a RRC resume message, a RRC setup message, a RRC security mode command message, or a RRC reestablishment message.

In some example embodiments, the connection resume procedure comprises a Small Data Transmission, SDT, procedure and a non-SDT procedure.

In some example embodiments, the SDT procedure or the non-SDT procedure comprises one of a RRC resume procedure, a RRC establishment procedure, and a RRC re-establishment procedure.

In some example embodiments, the first plurality of parameters comprise a first subset of the first plurality of parameters associated with the SDT procedure and a second subset of the first plurality of parameters associated with the non-SDT procedure.

In some example embodiments, the first plurality of parameters are ranked in a predetermined order indicating each of the first plurality of parameters is associated with the SDT procedure or the non-SDT procedure.

In some example embodiments, the request received from the first apparatus comprises one of a Radio Resource Control, RRC, resume request, a RRC reestablishment request, or a RRC SDT request.

In some example embodiments, the second apparatus further comprises: means for transmitting, to the first apparatus, an indication for indicating whether each of the first plurality of parameters is associated with the SDT procedure or the non-SDT procedure.

In some example embodiments, the second apparatus further comprises: means for determining whether the one or more parameter is associated with the SDT procedure or non-SDT procedure based on a resource on which the request is received.

In some example embodiments, the request comprises one of a first request for causing the SDT procedure to be performed or a second request for causing the non-SDT procedure to be performed, and the means for performing the corresponding one procedure comprises: means for in response to the first request, performing the SDT procedure with the first apparatus; and means for in response to the second request, performing the non-SDT procedure with the first apparatus.

In some example embodiments, the request is the first request and after performing the SDT procedure, the second apparatus further comprises: means for receiving another request from the first apparatus in the inactive state; and means for in accordance with a determination that the other request is the second request comprising at least a further one of the first plurality of parameters, performing the non-SDT procedure with the first apparatus.

In some example embodiments, the second apparatus further comprises: means for receiving a further request from the first apparatus; means for in accordance with a determination that the request is the second request comprising at least one of the first plurality of parameters for the non-SDT procedure, performing the non-SDT procedure with the first apparatus; and means for receiving the further data in the non-SDT procedure.

In some example embodiments, the second apparatus further comprises: means for receiving, from the first apparatus, a first indication for none of the first plurality of parameters being available for the SDT procedure; and means for receiving, from the first apparatus, a first indication for none of the first plurality of parameters being available for the SDT procedure.

In some example embodiments, the request is for causing the SDT procedure to be performed, and the means for performing the SDT procedure comprises means for receiving data related to the SDT from the first apparatus.

In some example embodiments, the second apparatus further comprises: means for receiving, from the first apparatus, a second indication for none of the first plurality of parameters being available for the non-SDT procedure; and means for in response to the second indication, transmitting a fourth plurality of parameters at least associated with the non-SDT procedure to the first apparatus, the fourth plurality of parameters not overlapping with the first plurality of parameters.

In some example embodiments, the second apparatus further comprises: means for transmitting, to the first apparatus, an indication for indicating whether a second plurality of parameters associated with the SDT and non-SDT procedures is released or remained, the second plurality of parameters not overlapping with the first plurality of parameters, and the second plurality of parameters transmitted earlier than the first plurality of parameters.

In some example embodiments, the first apparatus comprises a terminal device, and the second apparatus comprises a network device.

Figure 5:
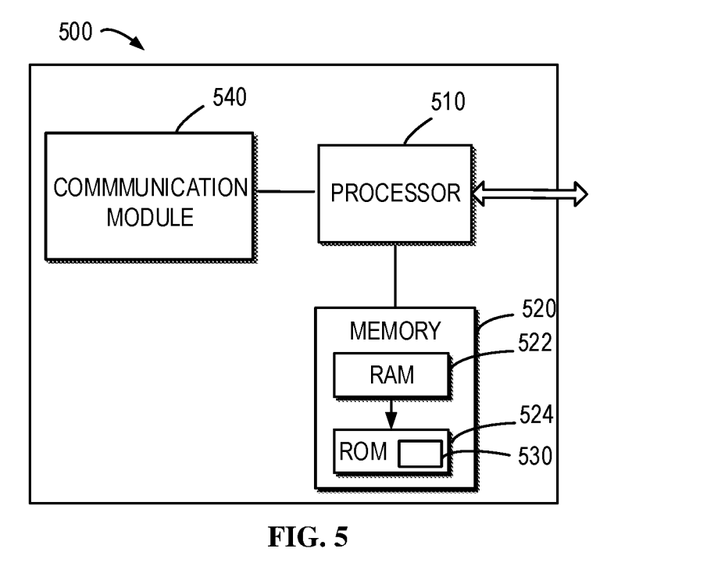
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 may be provided to implement the communication device, for example the first device 110 or the second device 120 as shown in FIG. 1. As shown, the device 500 includes one or more processors 510, one or more memories 520 coupled to the processor 510, and one or more transmitters and receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2-4. The embodiments of the present disclosure may also be implemented by hardware or by a combination of software and hardware.

Figure 6:
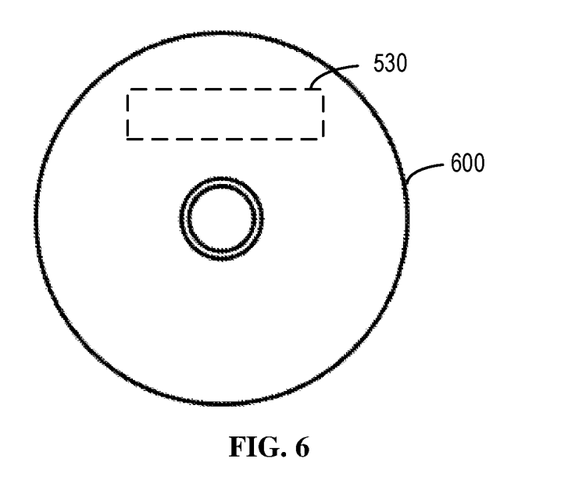
FIG. 6 illustrates a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 illustrates an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300 and 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;
the at least one memory and the computer program codes are configured to, with the at least one processor, cause the first device at least to:
receive, from a second device in a Radio Resource Control (RRC) release message, a RRC reconfiguration message, a RRC resume message, a RRC setup message, a RRC security mode command message, and a RRC reestablishment message, a first plurality of parameters associated with a connection resume procedure between the first device and the second device, wherein the first plurality of parameters comprises a plurality of Next-hop Chaining Counts (NCCs), a plurality of full Inactive Radio Network Temporary Identifiers (I-RNTIs), and a plurality of short I-RNTIs, wherein a first I-RNTI of the plurality of full I-RNTIs comprises an identity of the first device and an identity of the second device, and the plurality of short I-RNTIs comprise only the identities of the first device, wherein the connection resume procedure comprises a small data transmission (SDT) procedure and a non-SDT procedure, wherein the RRC release message includes an indication for indicating whether a second plurality of parameters associated with the SDT procedures and the non-SDT procedures is released or remained, the second plurality of parameters not overlapping with the first plurality of parameters, and the second plurality of parameters received earlier than the first plurality of parameters;
in accordance with a determination that the connection resume procedure and the SDT procedure is to be performed:
transmit, in an inactive state and to the second device, a request for connection resume, the request comprising the first plurality of parameters; and
transmit a first request for causing the SDT procedure to be performed, the first request comprising at least one of the first plurality of parameters; and
in accordance with a determination that the non-SDT procedure is to be performed, transmitting, in an inactive state and to the second device, a second request for causing the non-SDT procedure to be performed, the second request comprising at least another one of the first plurality of parameters;
in accordance with a determination that further data related to the SDT is to be transmitted and none of the first plurality of parameters is available for the SDT procedure, transmit, to the second device, a further request for causing the non-SDT procedure to be performed, the further request comprising at least one of the first plurality of parameters associated with the non-SDT procedure; and
transmit, to the second device, the further data in the non-SDT procedure;
transmit, to the second device, a first indication for indicating that no parameter is available for the SDT procedure in the first plurality of parameters;
receive a third plurality of parameters at least associated with the SDT procedure from the second device, the third plurality of parameters not overlapping with the first plurality of parameters; and
perform the connection resume procedure with the second device;
after performing the SDT procedure and in accordance with a determination that further data related to the non-SDT is to be transmitted and none of the first plurality of parameters is available for the non-SDT procedure, transmit a second indication to the second device; and
receive a fourth plurality of parameters at least associated with the non-SDT procedure from the second device, the fourth plurality of parameters not overlapping with the first plurality of parameters.

2. The first device of claim 1, wherein the request comprises an RRC resume request, an RRC reestablishment request, and a RRC small data transmission (SDT) request.

3. The first device of claim 2, wherein the first device is further caused to: determine the one or more parameter based on an order in the first plurality of parameters.

4. The first device of claim 3, wherein the SDT procedure or the non-SDT procedure comprises an RRC resume procedure, an RRC establishment procedure, and a RRC reestablishment procedure.

5. The first device of claim 4, wherein the first plurality of parameters comprise a first subset of the first plurality of parameters associated with the SDT procedure and a second subset of the first plurality of parameters associated with the non-SDT procedure.

6. The first device of claim 5, wherein the first plurality of parameters are ranked in a predetermined order indicating each of the first plurality of parameters is associated with the SDT procedure or the non-SDT procedure.

7. The first device of claim 6, wherein the first device is further caused to: receive, from the second device, an indication for indicating whether each of the first plurality of parameters is associated with the SDT procedure or the non-SDT procedure.

8. The first device of claim 7, wherein in accordance with a determination that the SDT procedure is to be performed, the first device is caused to perform the SDT procedure by: transmitting data related to the SDT to the second device.

9. The first device of claim 8, wherein the first device is further caused to: perform a cell reselection procedure with a third device based on at least a further one of the first plurality of parameters, the third device being different from the second device.

10. A system comprising:
a first device;
at least one processor; and
at least one memory including computer program codes;
the at least one memory and the computer program codes are configured to, with the at least one processor, cause the first device at least to:
  receive, from a second device in a Radio Resource Control (RRC) release message, a RRC reconfiguration message, a RRC resume message, a RRC setup message, a RRC security mode command message, and a RRC reestablishment message, a first plurality of parameters associated with a connection resume procedure between the first device and the second device, wherein the first plurality of parameters comprises a plurality of Next-hop Chaining Counts (NCCs), a plurality of full Inactive Radio Network Temporary Identifiers (I-RNTIs), and a plurality of short I-RNTIs, wherein a first I-RNTI of the plurality of full I-RNTIs comprises an identity of the first device and an identity of the second device, and the plurality of short I-RNTIs comprise only the identities of the first device, wherein the connection resume procedure comprises a small data transmission (SDT) procedure and a non-SDT procedure, wherein the RRC release message includes an indication for indicating whether a second plurality of parameters associated with the SDT procedures and the non-SDT procedures is released or remained, the second plurality of parameters not overlapping with the first plurality of parameters, and the second plurality of parameters received earlier than the first plurality of parameters;
  in accordance with a determination that the connection resume procedure and the SDT procedure is to be performed:
    transmit, in an inactive state and to the second device, a request for connection resume, the request comprising the first plurality of parameters; and
    transmit a first request for causing the SDT procedure to be performed, the first request comprising at least one of the first plurality of parameters; and
  in accordance with a determination that the non-SDT procedure is to be performed, transmitting, in an inactive state and to the second device, a second request for causing the non-SDT procedure to be performed, the second request comprising at least another one of the first plurality of parameters;
  in accordance with a determination that further data related to the SDT is to be transmitted and none of the first plurality of parameters is available for the SDT procedure, transmit, to the second device, a further request for causing the non-SDT procedure to be performed, the further request comprising at least one of the first plurality of parameters associated with the non-SDT procedure; and
  transmit, to the second device, the further data in the non-SDT procedure;
  transmit, to the second device, a first indication for indicating that no parameter is available for the SDT procedure in the first plurality of parameters;
  receive a third plurality of parameters at least associated with the SDT procedure from the second device, the third plurality of parameters not overlapping with the first plurality of parameters; and
  perform the connection resume procedure with the second device;
  after performing the SDT procedure and in accordance with a determination that further data related to the non-SDT is to be transmitted and none of the first plurality of parameters is available for the non-SDT procedure, transmit a second indication to the second device; and
  receive a fourth plurality of parameters at least associated with the non-SDT procedure from the second device, the fourth plurality of parameters not overlapping with the first plurality of parameters.

11. The system of claim 10, wherein the request comprises an RRC resume request, an RRC reestablishment request, and a RRC small data transmission (SDT) request.

12. The system of claim 11, wherein the first device is further caused to: determine the one or more parameter based on an order in the first plurality of parameters.

13. The system of claim 12, wherein the SDT procedure or the non-SDT procedure comprises an RRC resume procedure, an RRC establishment procedure, and a RRC re-establishment procedure.

14. The system of claim 13, wherein the first plurality of parameters comprise a first subset of the first plurality of parameters associated with the SDT procedure and a second subset of the first plurality of parameters associated with the non-SDT procedure.

15. The system of claim 14, wherein the first plurality of parameters are ranked in a predetermined order indicating each of the first plurality of parameters is associated with the SDT procedure or the non-SDT procedure.

16. The system of claim 15, wherein the first device is further caused to: receive, from the second device, an indication for indicating whether each of the first plurality of parameters is associated with the SDT procedure or the non-SDT procedure.

17. The system of claim 16, wherein in accordance with a determination that the SDT procedure is to be performed, the first device is caused to perform the SDT procedure by: transmitting data related to the SDT to the second device.

18. The system of claim 17, wherein the first device is further caused to: perform a cell reselection procedure with a third device based on at least a further one of the first plurality of parameters, the third device being different from the second device.

19. A method comprising:
receiving, by a first device from a second device in a Radio Resource Control (RRC) release message, a RRC reconfiguration message, a RRC resume message, a RRC setup message, a RRC security mode command message, and a RRC reestablishment message, a first plurality of parameters associated with a connection resume procedure between the first device and the second device, wherein the first plurality of parameters comprises a plurality of Next-hop Chaining Counts (NCCs), a plurality of full Inactive Radio Network Temporary Identifiers (I-RNTIs), and a plurality of short I-RNTIs, wherein a first I-RNTI of the plurality of full I-RNTIs comprises an identity of the first device and an identity of the second device, and the plurality of short I-RNTIs comprise only the identities of the first device, wherein the connection resume procedure comprises a small data transmission (SDT) procedure and a non-SDT procedure, wherein the RRC release message includes an indication for indicating whether a second plurality of parameters associated with the SDT procedures and the non-SDT procedures is released or remained, the second plurality of parameters not overlapping with the first plurality of parameters, and the second plurality of parameters received earlier than the first plurality of parameters;
in accordance with a determination that the connection resume procedure and the SDT procedure is to be performed:
transmitting, in an inactive state and to the second device, a request for connection resume, the request comprising the first plurality of parameters; and
transmitting a first request for causing the SDT procedure to be performed, the first request comprising at least one of the first plurality of parameters; and
in accordance with a determination that the non-SDT procedure is to be performed, transmitting, in an inactive state and to the second device, a second request for causing the non-SDT procedure to be performed, the second request comprising at least another one of the first plurality of parameters;
in accordance with a determination that further data related to the SDT is to be transmitted and none of the first plurality of parameters is available for the SDT procedure, transmitting, to the second device, a further request for causing the non-SDT procedure to be performed, the further request comprising at least one of the first plurality of parameters associated with the non-SDT procedure; and
transmitting, to the second device, the further data in the non-SDT procedure;
transmitting, to the second device, a first indication for indicating that no parameter is available for the SDT procedure in the first plurality of parameters;
receiving a third plurality of parameters at least associated with the SDT procedure from the second device, the third plurality of parameters not overlapping with the first plurality of parameters; and
performing the connection resume procedure with the second device;
after performing the SDT procedure and in accordance with a determination that further data related to the non-SDT is to be transmitted and none of the first plurality of parameters is available for the non-SDT procedure, transmit a second indication to the second device; and
receiving a fourth plurality of parameters at least associated with the non-SDT procedure from the second device, the fourth plurality of parameters not overlapping with the first plurality of parameters.

20. The method of claim 19, wherein the first plurality of parameters comprise a first subset of the first plurality of parameters associated with the SDT procedure and a second subset of the first plurality of parameters associated with the non-SDT procedure; and wherein the first plurality of parameters are ranked in a predetermined order indicating each of the first plurality of parameters is associated with the SDT procedure or the non-SDT procedure.

* * * * *